(12) United States Patent
Scarabelli et al.

(10) Patent No.: US 10,343,803 B2
(45) Date of Patent: Jul. 9, 2019

(54) METHODS AND APPARATUSES FOR GUIDED QUALITY CONTROL OF A PACKAGING SYSTEM

(71) Applicant: Tetra Laval Holdings & Finance S.A., Pully (CH)

(72) Inventors: Paolo Scarabelli, Reggio Emilia (IT); Alberto Cavani, Rubiera (IT); Claudio Donati, Modena (IT); Matteo Gazzadi Poggioli, Modena (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 16/066,537

(22) PCT Filed: Dec. 15, 2016

(86) PCT No.: PCT/EP2016/081300
§ 371 (c)(1),
(2) Date: Jun. 27, 2018

(87) PCT Pub. No.: WO2017/114666
PCT Pub. Date: Jul. 6, 2017

(65) Prior Publication Data
US 2019/0002147 A1   Jan. 3, 2019

(30) Foreign Application Priority Data
Dec. 30, 2015  (SE) ........................ 1500539

(51) Int. Cl.
*G06K 19/06*   (2006.01)
*B65B 57/02*   (2006.01)
(Continued)

(52) U.S. Cl.
CPC .............. *B65B 57/02* (2013.01); *B65B 9/207* (2013.01); *B65B 9/2049* (2013.01);
(Continued)

(58) Field of Classification Search
CPC ...................................................... B65N 57/02
(Continued)

(56) References Cited

U.S. PATENT DOCUMENTS 5,923,014 A * 7/1999 Szymusiak .......... G06Q 10/087
235/375
7,331,158 B2   2/2008 Mantell
(Continued)

FOREIGN PATENT DOCUMENTS

EP   1555524 A1   7/2005
EP   2444867 A1   4/2012
(Continued)

OTHER PUBLICATIONS

Office Action for Swedish Application No. 1500538-2 dated Aug. 4, 2016 in 5 pages.
(Continued)

*Primary Examiner* — Allyson N Trail
(74) *Attorney, Agent, or Firm* — Knobbe, Martens, Olson & Bear, LLP

(57) ABSTRACT

A method for quality control of a packaging system is provided. The method comprises receiving a record of packaging identification data, wherein the record of packaging identification data being related to a package. Next, identifying and receiving a record of machine data using said record of packaging identification data, wherein said record of machine data being related to a machine set up used when producing said package. Thereafter, identifying a packaging quality parameter to be checked based on said record of machine data, and requesting a record of packaging quality data related to said packaging quality parameter.

20 Claims, 5 Drawing Sheets

(51) Int. Cl.
*B65B 51/22* (2006.01)
*B65B 51/30* (2006.01)
*B65B 55/08* (2006.01)
*B65B 55/10* (2006.01)
*B65B 57/00* (2006.01)
*B65B 61/26* (2006.01)
*B65B 9/20* (2012.01)
*B65B 9/207* (2012.01)
*G06K 7/14* (2006.01)
*G05B 19/418* (2006.01)
*B65B 51/10* (2006.01)
*B29C 65/36* (2006.01)
*B29C 65/74* (2006.01)
*B29C 65/00* (2006.01)

(52) U.S. Cl.
CPC .......... *B65B 51/227* (2013.01); *B65B 51/306* (2013.01); *B65B 55/08* (2013.01); *B65B 55/103* (2013.01); *B65B 57/00* (2013.01); *B65B 61/26* (2013.01); *G06K 7/1417* (2013.01); *G06K 19/06037* (2013.01); *B29C 65/36* (2013.01); *B29C 65/7451* (2013.01); *B29C 66/1122* (2013.01); *B29C 66/4312* (2013.01); *B29C 66/73921* (2013.01); *B29C 66/81465* (2013.01); *B29C 66/83543* (2013.01); *B29C 66/849* (2013.01); *B65B 2051/105* (2013.01); *G05B 19/41875* (2013.01); *G05B 2219/45048* (2013.01); *Y02P 90/10* (2015.11); *Y02P 90/22* (2015.11)

(58) Field of Classification Search
USPC ....... 235/462.1, 462.11, 462.01, 462.25, 375
See application file for complete search history.

(56) References Cited

U.S. PATENT DOCUMENTS

| | | | |
|---|---|---|---|
| 7,482,908 | B2 | 1/2009 | Kean et al. |
| 8,427,018 | B2 * | 4/2013 | Dutau ...................... H02K 1/20 |
| | | | 310/52 |
| 8,719,782 | B2 | 5/2014 | DeHaan |
| 2004/0083018 | A1 | 4/2004 | Dollevoet et al. |
| 2005/0228529 | A1 | 10/2005 | Lev-Ami et al. |
| 2006/0149407 | A1 | 7/2006 | Markham et al. |
| 2009/0302102 | A1 * | 12/2009 | Nemet ................... G06Q 30/06 |
| | | | 235/376 |
| 2013/0209326 | A1 * | 8/2013 | Williams ................. C12Q 1/68 |
| | | | 422/502 |
| 2017/0091706 | A1 * | 3/2017 | Lloyd ................ G06Q 10/0833 |
| 2018/0018625 | A1 | 1/2018 | Spruell et al. |

FOREIGN PATENT DOCUMENTS

| | | |
|---|---|---|
| GB | 2261153 A | 5/1993 |
| WO | WO 01/00491 A1 | 1/2001 |

OTHER PUBLICATIONS

Office Action for Swedish Application No. 1500539-0 dated Aug. 4, 2016 in 5 pages.
Search Report and Written Opinion for International Application No. PCT/EP2016/081298 dated Mar. 16, 2017 in 9 pages.
Search Report and Written Opinion for International Application No. PCT/EP2016/081300 dated Mar. 16, 2017, in 9 pages.

* cited by examiner

METHODS AND APPARATUSES FOR GUIDED QUALITY CONTROL OF A PACKAGING SYSTEM

TECHNICAL FIELD

The subject matter generally relates to the field of packaging. More particularly, it relates to methods for quality control of packaging systems and related data processing apparatuses.

BACKGROUND

Carton based packages for liquid food products are well known in most parts of the world. For instance, Tetra Brik® packages are used in many parts of the world for milk, juice and other beverages. There are several reasons why carton based packages have gained such popularity. The environmental benefits of the packages, e.g. that the packages are to a large extent produced by renewable material and the efficient logistics of brick shaped packages, are some reasons for this popularity. Another reason why carton based packages are popular is that the filling machines producing the packages are cost efficient compared to other alternatives and that the total cost for running a carton based filling machine is very competitive.

There are generally two different types of filling machines for carton packages, blanks fed packaging machines and roll fed packaging machines. For blanks fed packaging machines, blanks, being pieces of packaging material with two ends welded together such that a folded sleeve is formed, are fed to the filling machine, erected into an open sleeve, folded and sealed such that bottoms are formed, filled with product and sealed and folded such that a package filled with product is achieved. For roll fed packaging machines a tube is formed from a web of packaging material by continuously directing the web and making a longitudinal sealing. The tube is filled with product and then by making successive transversal sealings and cuttings in a lower end of the tube, packages are formed. By providing means for holding the tube in position during the transversal sealing and cutting, and by providing subsequent folding means different forms may be obtained.

In order to assure that packages produced by carton based packaging systems fulfill quality standards quality control systems are used. Today, these systems often involve manual moments, which increases a risk for that incorrect information is input. Since the feedback provided via the quality control systems is important in order to become aware of maintenance needed for the packaging system, there is a need for further improve the quality control systems such that anomalies can be detected at an even earlier stage. This will have the positive effect that maintenance of the packaging can be made more efficiently, in turn providing for that the down time of the packaging system can be reduced even further.

SUMMARY

Accordingly, the presented methods and apparatuses seek to mitigate, alleviate or eliminate one or more of the above identified deficiencies in the art and disadvantages singly or in combination and solves at least the above mentioned problems according to any one of the aspects below.

According to a first aspect it is provided a method for quality control of a packaging system, said method comprising receiving a record of packaging identification data, said record of packaging identification data being related to a package, identifying and receiving a record of machine data using said record of packaging identification data, said record of machine data being related to a machine set up used when producing said package, identifying a packaging quality parameter to be checked based on said record of machine data, and requesting a record of packaging quality data related to said packaging quality parameter.

The method may further comprise receiving machine data from said packaging system, receiving package identification data from said packaging system, and linking said machine data to said packaging identification data such that a package can be related to a machine set up.

In said step of linking said machine data to said packaging identification data, time stamps may be used for enabling said linking.

The machine data may comprise information on at least one machine part in said packaging system.

The machine data may comprise information on at least one machine setting of said packaging system.

The method may further comprise receiving a record of packaging quality data related to a pre-determined packaging quality parameter, and wherein said step of identifying said packaging quality parameter to be checked may be based on said record of machine data and said record of packaging quality data related to said pre-determined packaging quality parameter.

The package may be physically marked such that said packaging identification data related to said package can be extracted from said package itself.

The package may be marked with a two dimensional printed code, such as a QR code or Data Matrix code.

The step of identifying said packaging quality parameter to be checked based on said record of machine data may comprise using historical information from said packaging system and/or information from other packaging systems.

According to a second aspect it is provided a data processing apparatus configured to receive a record of packaging identification data, said record of packaging identification data being related to a package, identify and receive a record of machine data using said record of packaging identification data, said record of machine data being related to a machine set up used when producing said package, identify a packaging quality parameter to be checked based on said record of machine data, and request said packaging quality parameter.

The data processing apparatus may be configured to receive machine data from a packaging system, receive package identification data from said packaging system, link said machine data to said packaging identification data such that a package can be related to a machine set up used when producing said package.

The data processing apparatus may be connected to a database storing information from a plurality of packaging systems such that said packaging quality parameter to be checked may be identified based on information from at least a subset of said plurality of packaging systems.

The term packaging quality parameter is to be interpreted as a feature of the package to check from a quality perspective. For example, one packaging quality parameter can be placement of a longitudinal sealing on a rear panel measured in a specific way.

The term packaging quality parameter data is to be interpreted as data related to a packaging quality parameter.

The term record of packaging quality parameter data is to be interpreted as a value or a group of values related to the packaging quality parameter for a specific package.

The term package is also to be interpreted broadly. It could be a so-called primary package containing liquid food product or the like. It could also be a secondary package comprising a number of primary packages.

BRIEF DESCRIPTION OF THE DRAWINGS

The above, as well as additional objects, features and advantages of the present invention will be better understood through the following illustrative and non-limiting detailed description of different embodiments of the present invention, with reference to the appended drawings, wherein.

DETAILED DESCRIPTION

Figure 1:
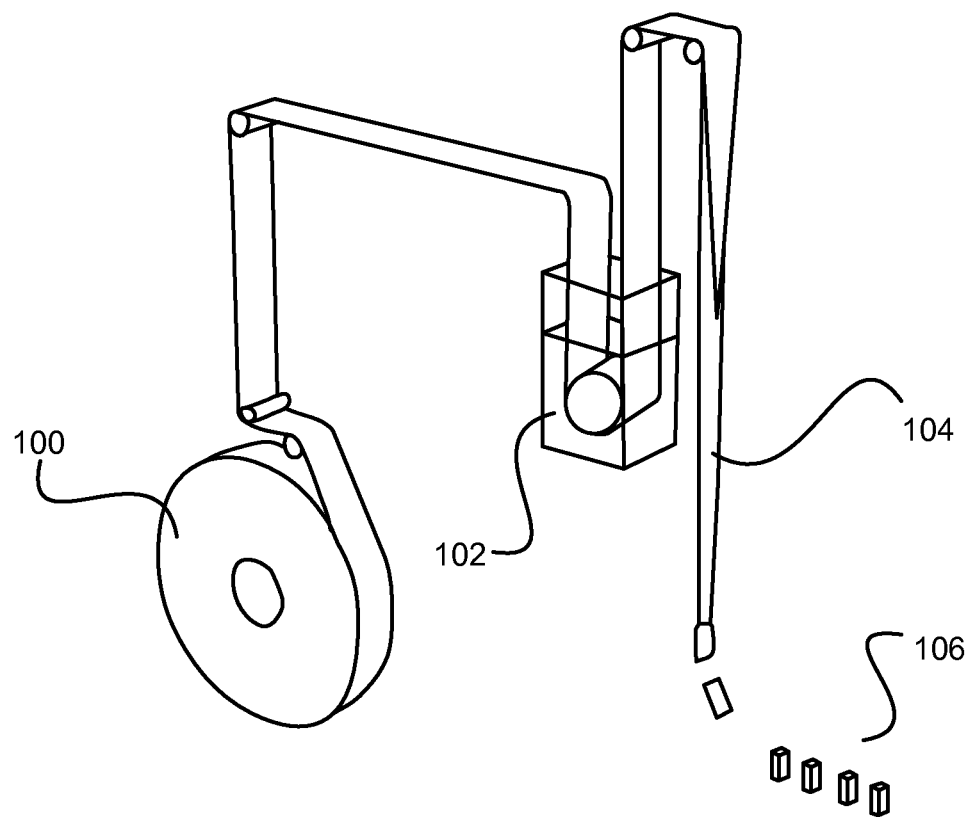
FIG. 1 illustrates a general principle for a roll fed carton packaging machine.

Before going into details of methods and data processing apparatuses for quality control of packaging systems a brief introduction to roll-fed carton based packaging systems will be given. FIG. 1 generally illustrates the basic principle of such a roll fed carton based packaging system used for example for continuous packaging of liquid food products. A well known example of such system is Tetra Brik™ marketed by Tetra Pak™.

Packaging material is delivered in packaging material reels 100 to the dairy or other site where the filling machine is placed. Before being delivered the packaging material has been produced and printed in a so-called converting factory. After unwinding the packaging material this is fed into a bath 102 in order to sterilize the packaging material, i.e. kill unwanted microorganisms. There are different ways to achieve this, but today one of the most commonly used methods is to use hydrogen peroxide. Another alternative to kill microorganisms is by using low-voltage electron beam (LVEB) technology. After being sterilized the packaging material is formed into a tube 104. More particularly, longitudinal ends are attached to each other continuously in a process often referred to as longitudinal sealing. When having formed a tube, this is filled with product, such as milk. Packages 106 are formed from the tube by making transversal sealings in an end of the tube and cutting off sealed portions as they are formed. In order to shape the packages different measures can be made during the transversal sealing as well as after the transversal sealing.

There are a number of critical processes run in parallel in the roll-fed packaging system that may cause quality issues in the produced packages if for example these processes are not properly tuned or if there are machine parts that have been worn out. One critical process in a filling machine, being a piece of equipment in a packaging system that form packages and fill these with product, is by way of example illustrated in FIG. 2.

Figure 2:
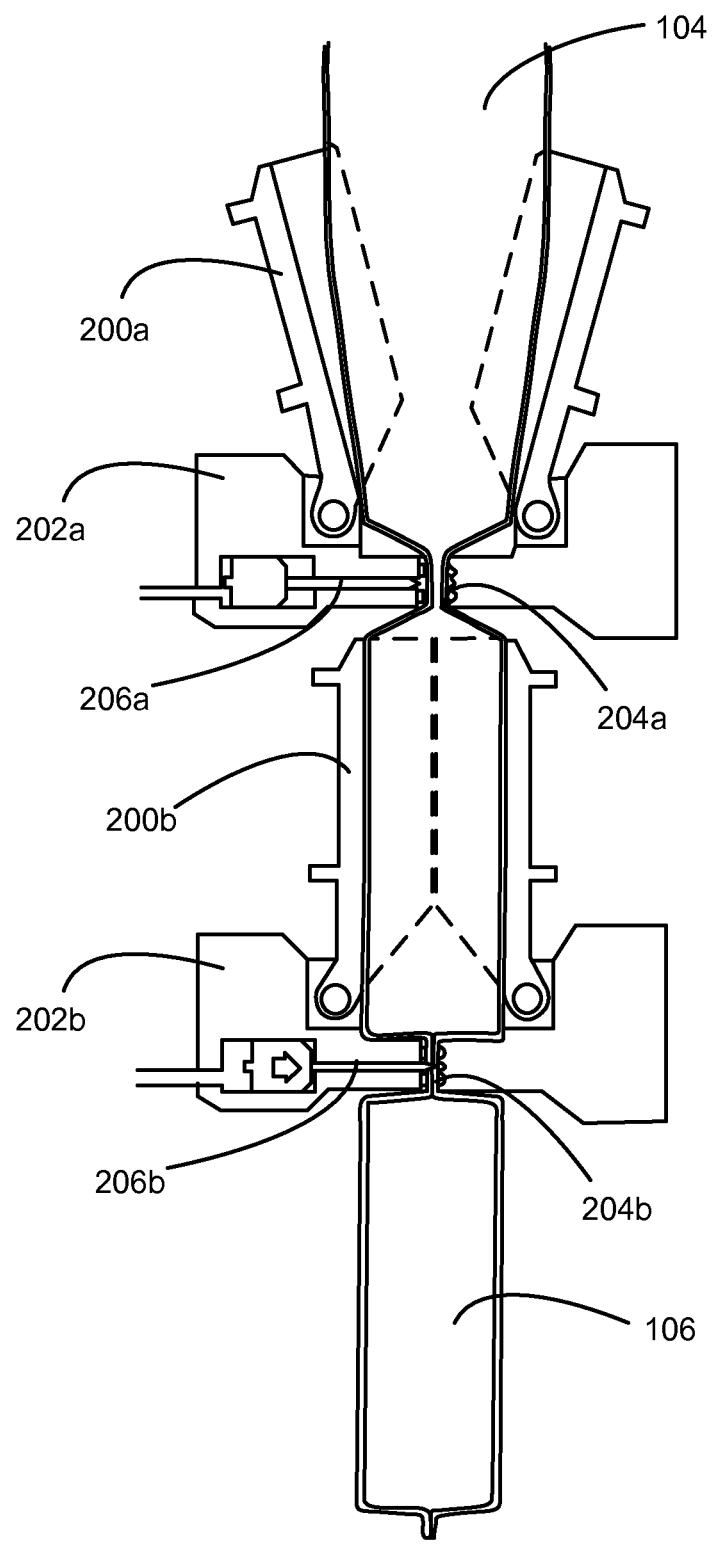
FIG. 2 illustrates an example of transversal sealing in a roll fed carton packaging machine.

More particularly, FIG. 2 illustrates the transversal sealing in greater detail. In order to form packages from the tube 104 forming flaps 200a, 200b in combination with sealing jaws 202a, 202b can be used. Each sealing jaw 202a, 202b comprises a sealing device 204a, 204b and a knife 206a, 206b, or other cutting element, for separating a formed package from the tube.

The forming flaps and the sealing jaws are moved along with the tube and in FIG. 2 a first and a second stage are illustrated. In a first stage the forming flaps 200a is starting to form the tube into a shape of the package and the sealing jaws 202a is forming a transversal sealing using the sealing device 204a. In the second stage the forming flaps 200b are held in position such that the package shape is formed. Also in the second stage, the sealing jaws 202b is forming a transversal sealing using the sealing device 204b and after having made the transversal sealing a lower part of the tube, in this stage having both ends closed by transversal sealings, is cut off using the knife 206b.

In order to make sure that the sealings are properly made it is important that the packaging material is heated properly such that the plastic layers melt and that adequate pressure is applied. This means that the sealing device needs to be efficient in terms of inducing a current in the packaging material, but also be resistant in order to withstand the pressure involved when making the transversal sealing. If not the sealings are properly made this will result in that the packages will not fulfill the quality standards. Another example that may lead to package quality issues is if the tube is slightly twisted when being fed into the forming flaps.

By having a quality control of the packages produced by the packaging system, problems related to worn out parts in the system, non-optimal settings etc may be detected. With information of the quality problems of the packages a specialist may be able to understand what to change in the packaging system. In other words, quality control of the packages is not only made in order to make sure that the packages fulfill a set specification and look good, but also in order to understand the condition of the packaging system and if something in the packaging system should be changed.

In quality control systems used today packages produced by the packaging system are most often controlled according to a pre-set scheme. However, since packages are most often not marked with identification data, it is a challenge to keep track of when the package being quality controlled was produced and in which machines. For example, when this does not work appropriately there can be situations in which it cannot be said for sure if the package with quality issues was produced by a machine before or after this was serviced and machine parts were replaced. Having this kind of situations requires additional work, and more importantly increases the down time of the packaging system.

Figure 3:
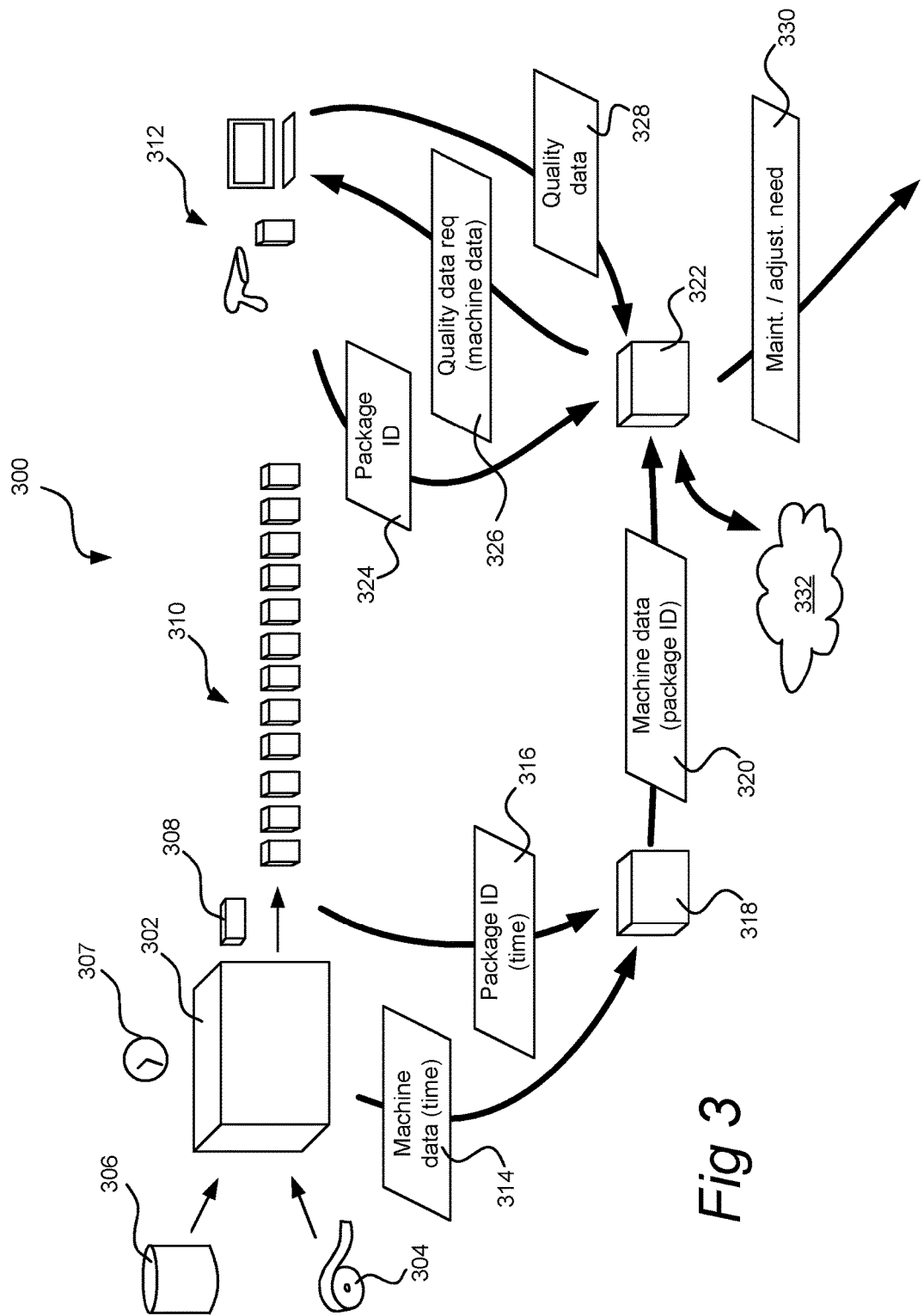
FIG. 3 illustrates a general principle for quality control of a packaging system.

In order to overcome many of the problems with the today used quality control systems, it is suggested a quality control system as illustrated in FIG. 3. Three elements of this system are that the packages are marked individually with identification data, machine data is linked to each package, and quality data requests are dynamic.

Starting with having each package marked with identification data, this has the advantage that when a package with quality issues is found this can easily be identified and an analysis in order to find out what caused the quality problems can be started easily. Another advantage is that problems caused by the fact that an operator looses track of from which machine the package originates and when the package was produced will be mitigated.

By linking machine data, e.g. information on which parts that are used and the settings used, with individual packages or groups of packages, it is possible when finding a package with identification data to link these packages to a certain machine set up, e.g. which parts are being used, how long these parts have been used, which settings are being used etc. In this way an analysis of what caused the quality issues of the packages can be started based on machine data comprising information on the machine set up linked to the package.

By having information on the machine data, this data may be used for finding quality parameters to look into further. In other words, unlike the common approach today to look into a number of predetermined quality parameters in a predetermined order, the machine data related to the package can be taken into account in order to decide what quality parameter to look into. Input related to this quality parameter may then, together with the machine data, form basis for deciding on which quality parameter to look into in a next step and so on. In other words, instead of using a static approach for quality control of packages a dynamic approach, that may take into account both machine data automatically fetched via the package identification data and already given input, can be used.

For instance, if a package with a displaced longitudinal sealing is found the quality control can start with scanning a code printed on the package such that machine data related to the package can be fetched. Based on the machine data it is determined which quality parameter to check in order to narrow down a number of possible reasons for the quality issue. When having determined which quality parameter to check a question can be posed to a person performing the quality control. Based on input from the person another quality parameter can be determined, and so on.

FIG. 3 illustrates a system 300 comprising a packaging system 302. The packaging system 302 can be a roll-fed packaging system, but also a blanks fed carton packaging system, a PET bottling system or the like. It can comprise one piece of equipment or a number of different pieces of equipments, sometimes referred to as a filling line.

The packaging system 302 can be fed with packaging material 304, such as a reel of packaging material, and product 306 to be filled in packages that are formed. In order to be able to later on link a certain package to a certain machine set up a clock 307 can be used for making sure that the machine set up at a certain point of time can be determined and stored and also to make sure that a point of time for when the package was produced can be determined and stored. In order to give each package unique identification data an identification marker 308 can be used. The identification marker 308 may be an inkjet printer that can print a unique code, such as a two dimensional code, on each package.

Some of the packages 310 formed and marked with identification data can be fed from the packaging system 302 to a quality control station 312. The quality control station may be equipped with a scanner for reading the identification code on the package to assess from a quality perspective, but if not a printed code is used another type of equipment can be used.

Even though physically marking each package individually is at present seen to be a good option, it may future wise e.g. be that camera based system following the packages from being formed until they reach the quality control system can be used as an alternative to physically marking each package individually.

In order to make sure that machine data for the packages 310 can be made available at the quality control station 312, machine data 314 and package identification data 316 can be fed from the packaging system 302 to a machine data processing device 318. In this example, in order to be able to link machine data to packages time stamps are provided for the machine data as well as the package identification data. When having linked the information machine data linked to package identification data 320 can be transmitted to a quality control data processing device 322.

In order to fetch the available information related to a certain package the package identification data 324 can be read from the package. Based on the package identification data 324 machine data for the package can be retrieved and analyzed. The analysis can have the purpose of deciding on which quality parameter the operator is to look into in order to be able in a next step to narrow down the possible reasons for the quality issues. Alternatively, the purpose can be to train the analysis software and then which quality parameter to ask the operator to look into may be chosen such that a gap in the database can be filled. Different technologies for analyzing the machine data may be used. For instance, neural networks may be used.

When having analyzed the machine data, a quality data request 326 can be sent to the quality control station 312. This request may show up on a screen. If the operator is not certain on how to obtain the requested quality data, he or she may ask for instructions via the screen and a video presenting how to do it can be shown. This is not only an efficient way of working, but also a good way of securing that the quality data is obtained in a reliable way. When having the quality data 328 this can be input by the operator and sent back to the quality control data processing device 322. Although not illustrated, this process may be repeated a number of times for different types of quality data and for each time new information is input by the operator this may be taken into account before asking for additional quality data. Even though the quality control station is illustrated as an at least partly manually handled station, this is only to be seen as example. Another option, although not illustrated, would be a fully automatic quality control station in which for example robot arms and cameras are performing the quality control.

In case the quality control data processing device 322 reaches a conclusion that there is a need for maintenance and/or adjustments, maintenance/adjustment need data 330 may be sent to for instance the operators of the plant and/or the packaging system supplier.

In order to be able to decide what to ask the operator of the quality control station 312 to look for historical data for the packaging system may be used. In other words, if there is a similarity between machine data and quality data related to a package being analyzed and machine data and quality data related to another package analyzed some time ago the learning made some time ago can be used. In addition or instead, learnings made from similar situations in other packaging systems, illustrated by a cloud 332, can be used when making the decision on which quality parameter to look into.

Although the machine data processing device 318 and the quality control data processing device 322 are illustrated and described as two different pieces of equipment, this does not have to be the case. The two may also be comprised in one and the same data processing device or in a plurality of different data processing devices.

Figure 4:
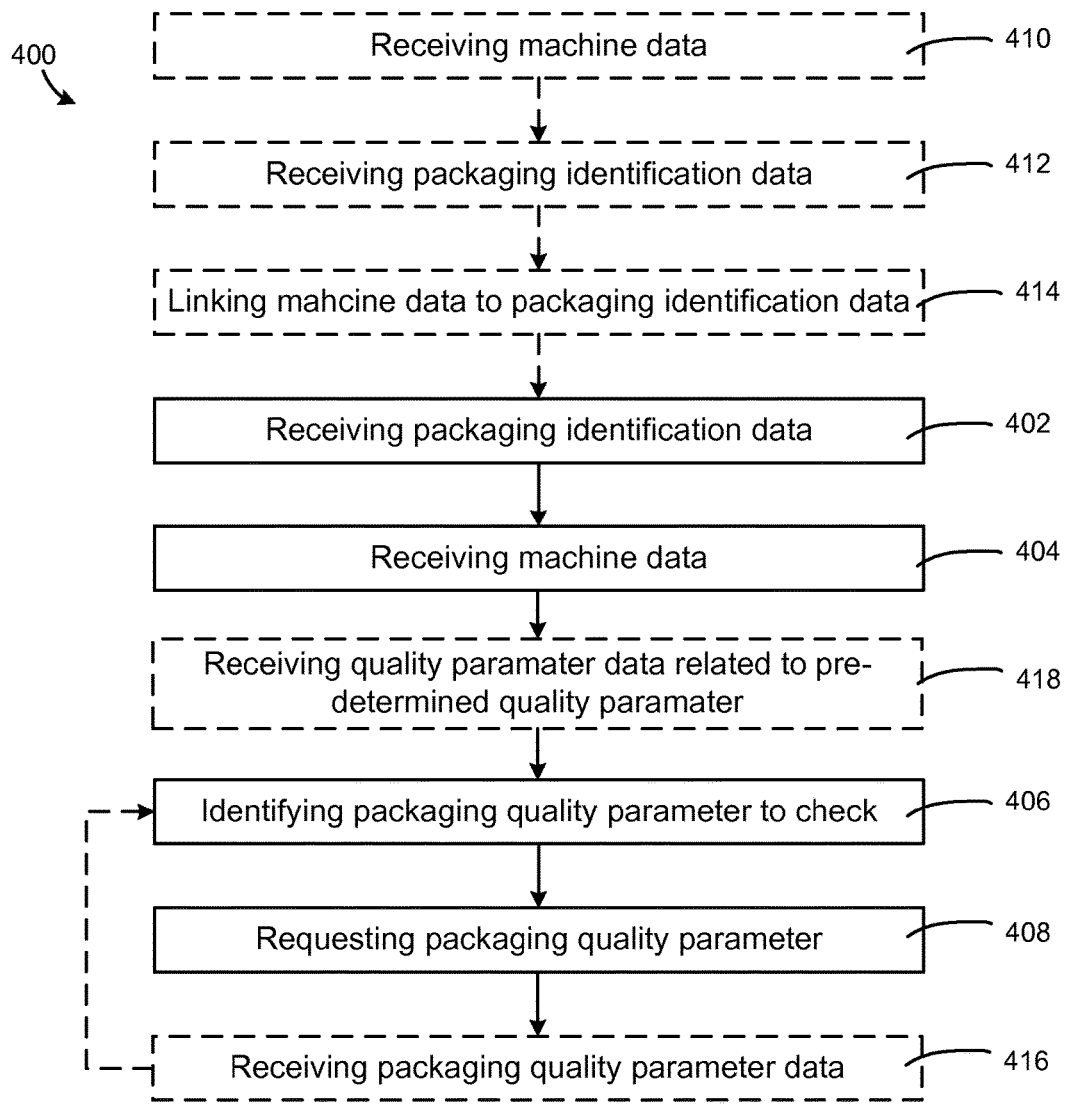
FIG. 4 illustrates a flow chart of an example of a process for dynamic quality control of a packaging system.

FIG. 4 illustrates an example of a flow chart 400 for dynamic quality control of a packaging system in line with what is illustrated in FIG. 3.

In a first step 402 packaging identification data is received. The packaging identification data may be obtained by an operator scanning a two dimensional code printed on a package being quality assessed.

When having identified the package machine data related to the package can be received in a second step 404, for example by sending a request including the received packaging identification data to a database having information on machine data for packages and as a response receive machine data related to the package being quality assessed. The machine data may comprise information on which machine that produced the package, which parts that were in the machine when the package was produced, for how long time the parts had been used when the package was produced, which settings that were used when producing the package, which kind of packaging material the machine was set to handle, which kind of product the machine was set to fill, etc.

With the machine data, a packaging quality parameter to check can be identified in a third step 406. Which quality parameter to be checked can be decided in a number of different ways, but also from different starting points. One starting point may be in order to identify a non-optimal setting or a non-optimal working machine part. With this starting point the machine data can be used to find out if there is historical data showing that this machine data is likely to result in a certain maintenance need in the near future or in the more distant future. This may be achieved by finding similar machine data sets previously found in the same packaging system or other similar packaging systems and to see what maintenance need followed.

Another starting point may be in order to fill gaps in the historical data. For instance, if it is found that there is not enough information in a database comprising the historical data in a certain area such that a certain machine data set cannot be linked to a maintenance need in a reliable way additional information in this field can be requested.

Still another starting point is to make sure that the quality control fulfills agreed terms. For instance, that a certain number of packages are quality controlled for each batch, that a certain set of quality parameters are checked, etc.

When having determined which quality parameter to check in a fourth step 408 a request to check this parameter can be sent to the quality control station.

In order in step 404 to be able to receive machine data linked to the packaging identification data received in step 402, machine data may be received from the packaging system producing packages in step 410 and packaging identification data related to the packages in step 412. When having this information the two data sets may be linked to each other in step 414. One way of linking the two data sets is by using time stamps. For instance, if information on machine set up together with a time stamp is given and also information on packaging identification is given with a time stamp the two can be linked by using the time stamps.

After having received the quality parameter data this information may be used in a step 416 to determine which packaging quality parameter to check in a next step. Which packaging quality parameter to check in the next step may be determined based on the received quality parameter data as such or the received packaging quality parameter data together with the machine data.

Optionally before the step 406 of identifying the packaging quality parameter to check, a pre-determined quality parameter can be checked. If doing so input to the step 406 can be not only the machine data, but also packaging quality parameter data related to the pre-determined quality parameter.

Figure 5:
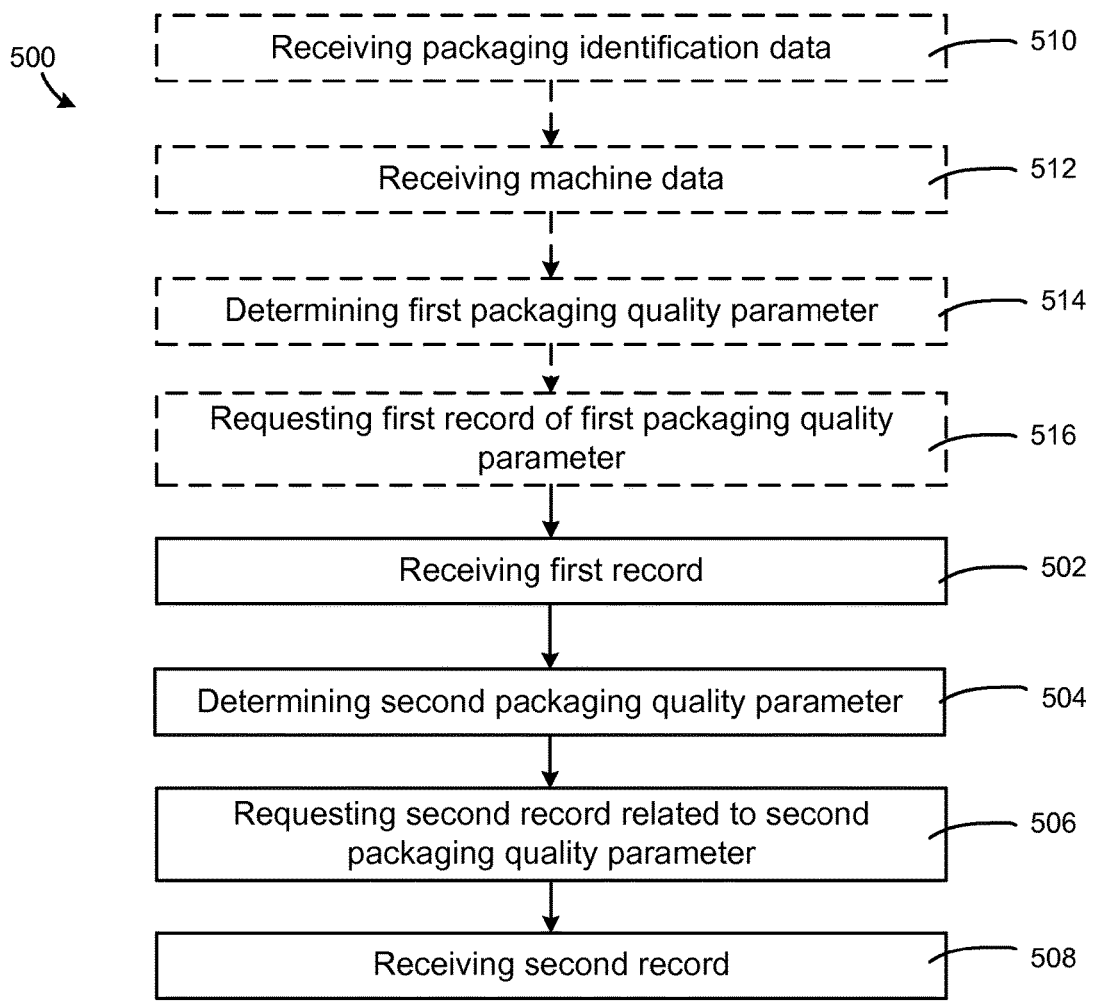
FIG. 5 illustrates a flow chart of another example of a process for dynamic quality control of a packaging system.

FIG. 5 illustrates another example of a flow chart 500 for dynamic quality control of a packaging system.

In a step 502 a first record of a packaging quality parameter data related to a first packaging quality parameter is received. Based on the first record a second packaging quality parameter can be determined in a step 504. In a simple form this can be determined by having a pre-determined set of rules saying e.g. that if a first value related to said first record is below a first threshold one packaging quality parameter should be assessed and if said first record is above said first threshold another packaging quality parameter should assessed. It could also be that the second packaging quality parameter is chosen based on an outcome of a previously assessed package. Further, if not all packaging quality parameters are assessed for every package, the second packaging quality parameter can be chosen based on which packaging quality parameters that have been assessed less frequently. Still an option is to choose the second packaging quality parameter in order to be able to find a maintenance need in a fast manner. If so, a relationship found between a number of different packaging quality parameters and the maintenance need can be used for identifying the second packaging quality parameter to check.

After having identified the second packaging quality parameter a second record related to said second packaging quality parameter can be requested in step 506 and after the second record has been obtained for instance by measuring a feature of the package the second record is received in step 508.

Optionally, in order to know which package that is being assessed a packaging identification data can be received in step 510, for instance by having a printed two dimensional barcode comprising a record of the packaging identification data printed on the package and a scanner for retrieving the record at a quality control station. As illustrated in FIG. 5, usually this step 510 is performed as a first step in the quality control procedure.

Optionally, in order to have information on the machine set up used when producing the package being assessed machine data can be received in step 512. As described above, the machine data may comprise information on which parts that were used when producing the package, which settings that were used when producing the package, etc.

In step 514 the first packaging quality parameter can be determined. This may include taking into account the machine data. For instance, if it is known that parts of the transversal sealing system was recently replaced when producing the package it can be determined that a packaging quality parameter related to the transversal sealing of the package should be set as the first packaging quality parameter.

After having determined the first packaging quality parameter a request for this first packaging quality parameter can be sent in step 516 to e.g. a data processing apparatus used at the quality control station.

The invention has mainly been described above with reference to a few embodiments. However, as is readily appreciated by a person skilled in the art, other embodiments than the ones disclosed above are equally possible within the scope of the claimed subject matter according to the appended claims.

The invention claimed is:

1. A method for quality control of a packaging system, said method comprising:

receiving package identification data from said packaging system with a data processing device at a first time, said package identification data related to a package;

receiving machine data from said packaging system with said data processing device at a second time, said machine data being related to a machine set up used when producing said package with said packaging system;

linking said machine data to said package identification data such that said package can be related to said machine set up used when producing said package with said packaging system;

receiving said package identification data at a third time, the third time being later than the first and second times;

identifying and receiving said machine data using said package identification data;

comparing said received machine data with historical information related to said packaging system and/or another packaging system and subsequently determining a condition of said packaging system based on said comparison;

identifying a packaging quality parameter to be checked based on said determination of said condition of said packaging system and subsequently requesting a packaging quality data related to said packaging quality parameter; and receiving said packaging quality data with the data processing device.

2. The method according to claim 1, wherein said step of linking said machine data to said package identification data comprises using time stamps to enable said linking.

3. The method according to claim 1, wherein said machine data comprises information on at least one machine part in said packaging system.

4. The method according to claim 1, wherein said machine data comprises information on at least one machine setting of said packaging system.

5. The method according to claim 1, further comprising:
receiving a record of packaging quality data related to a pre-determined packaging quality parameter; and
wherein said step of identifying said packaging quality parameter to be checked is based on said determination of said condition of said packaging system and said record of packaging quality data related to said pre-determined packaging quality parameter.

6. The method according to claim 1, wherein said package is physically marked such that said package identification data related to said package can be extracted from said package itself.

7. The method according to claim 6, wherein said package is marked with a two dimensional printed code.

8. The method according to claim 7, wherein said two dimensional barcode printed on said package is a QR code.

9. The method according to claim 7, wherein said two dimensional barcode printed on said package is a Data Matrix code.

10. The method according to claim 1, wherein said condition of said packaging system relates to a likelihood of a maintenance need of said packaging system.

11. The method according to claim 1, further comprising sending, with the data processing device, said packaging quality data related to said packaging quality parameter to at least one of a plant operator and a packaging system supplier.

12. The method according to claim 1, further comprising scanning said package identification data with a scanner of the packaging system.

13. The method according to claim 1, wherein said packaging quality parameter is related to a transversal or longitudinal sealing of said package.

14. A data processing apparatus configured to:
receive package identification data from a packaging system at a first time, said package identification data related to a package;
receive machine data from said packaging system at a second time, said machine data related to a machine set up used when producing said package with said packaging system;
link said machine data to said package identification data such that said package can be related to the machine set up used when producing said package with said packaging system;
receive said package identification data at a third time, said third time being later than the first and second times;
identify and receive said machine data using said package identification data
compare said received machine data with information from at least a subset of a plurality of packaging systems stored in a database;
identify a packaging quality parameter to be checked based on said comparison of said received machine data with said information stored in said database and subsequently request a packaging quality data related to said packaging quality parameter; and
receive the packaging quality data.

15. The data processing apparatus according to claim 14, wherein the apparatus is further configured to:
determine a condition of said packaging system based on said comparison of said received machine data with said information from the at least a subset of the plurality of packaging systems stored in the database; and
identify the packaging quality parameter to be checked based on said comparison of said received machine data with said information and said determination of said condition of said packaging system.

16. The data processing apparatus according to claim 15, wherein said condition of said packaging system relates to a likelihood of a maintenance need of said packaging system.

17. The data processing apparatus according to claim 14, wherein said machine data comprises information on at least one machine part in said packaging system.

18. The data processing apparatus according to claim 14, wherein said machine data comprises information on at least one machine setting of said packaging system.

19. The data processing apparatus according to claim 14, wherein said packaging quality parameter is related to a transversal or longitudinal sealing of said package.

20. The data processing apparatus according to claim 14, wherein the data processing apparatus is configured to communicate with a scanner at a quality control station, the scanner configured to electronically scan said package identification data at the quality control station, and wherein the data processing apparatus is configured to receive said scanned package identification data from the scanner.

* * * * *